(12) United States Patent
Wang et al.

(10) Patent No.: US 10,381,932 B1
(45) Date of Patent: Aug. 13, 2019

(54) POWER CONVERSION DEVICE AND CONTROL METHOD THEREOF

(71) Applicant: Chicony Power Technology Co., Ltd., New Taipei (TW)

(72) Inventors: Ssu-Hao Wang, New Taipei (TW); Tso-Jen Peng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/121,658

(22) Filed: Sep. 5, 2018

(30) Foreign Application Priority Data

Jul. 10, 2018 (TW) .............................. 107123893 A

(51) Int. Cl.
*H02M 3/335* (2006.01)
*H02M 1/32* (2007.01)
*H02M 1/00* (2006.01)

(52) U.S. Cl.
CPC ......... *H02M 3/33507* (2013.01); *H02M 1/32* (2013.01); *H02M 2001/0006* (2013.01)

(58) Field of Classification Search
CPC ......... H02M 3/33507; H02M 3/33523; H02M 3/33569; H02M 3/33576; H02M 3/33592; H02M 3/24; H02M 3/155; H02M 3/337; H02M 3/3376; H02M 2001/0006; H02M 2001/0025; H02M 2001/0058; H02J 1/00; H04B 1/715; Y02B 70/1433; Y02B 70/1491
USPC ............................................ 363/21.01–21.18
See application file for complete search history.

(56) References Cited

U.S. PATENT DOCUMENTS

| | | | |
|---|---|---|---|
| 6,480,399 B2 | 11/2002 | Balakrishnan et al. | |
| 6,538,908 B2 | 3/2003 | Balakrishnan et al. | |
| 6,853,563 B1 | 2/2005 | Yang et al. | |
| 8,698,474 B2 | 4/2014 | Yang et al. | |
| 8,780,515 B2 | 7/2014 | Chien et al. | |
| 9,407,154 B2 * | 8/2016 | Freeman ........... | H02M 3/33523 |
| 9,520,868 B2 | 12/2016 | Duan et al. | |

(Continued)

FOREIGN PATENT DOCUMENTS

| | | |
|---|---|---|
| CN | 100525025 C | 8/2009 |
| TW | I302053 B | 10/2008 |

(Continued)

*Primary Examiner* — Yemane Mehari
(74) *Attorney, Agent, or Firm* — CKC & Partners Co., LLC

(57) ABSTRACT

A power conversion device includes a primary side rectifier, a main converter, a secondary side rectifier, a secondary side feedback controller, a PWM controller, and a driving compensator. The primary side rectifier is configured to generate a first voltage. The main converter includes a power transistor and is configured to adjust the first voltage to generate a second voltage according to a control signal. The secondary side rectifier is configured to generate an output voltage according to the second voltage. The secondary side feedback controller is configured to generate a feedback signal according to the output voltage. The PWM controller is configured to generate a PWM signal according to the feedback signal. The driving compensator includes a driving resistor circuit. The PWM signal outputs the control signal through the driving resistor circuit, and the driving compensator adjusts a resistance value of the driving resistor circuit according to the first voltage.

15 Claims, 5 Drawing Sheets

(56) References Cited

U.S. PATENT DOCUMENTS

| | | | |
|---|---|---|---|
| 2010/0091420 A1 | 4/2010 | Tsai et al. | |
| 2013/0223107 A1* | 8/2013 | Zhang | H02M 3/33523 363/21.16 |
| 2013/0250627 A1* | 9/2013 | Herfurth | H02M 3/3376 363/21.15 |
| 2014/0043867 A1* | 2/2014 | Sugawara | H02M 3/33507 363/21.15 |
| 2016/0118898 A1* | 4/2016 | Peng | H02M 3/33507 363/21.18 |
| 2017/0155330 A1 | 6/2017 | Chen et al. | |
| 2017/0366044 A1 | 12/2017 | Tao et al. | |
| 2018/0019677 A1* | 1/2018 | Chung | H02M 3/155 |
| 2018/0159521 A1 | 6/2018 | Tsurumaru | |

FOREIGN PATENT DOCUMENTS

| | | |
|---|---|---|
| TW | 200903969 A | 1/2009 |
| TW | 201628322 A | 8/2016 |
| WO | 2015134813 A1 | 9/2015 |
| WO | 2018055864 A1 | 3/2018 |

\* cited by examiner

POWER CONVERSION DEVICE AND CONTROL METHOD THEREOF

CROSS-REFERENCE TO RELATED APPLICATION

This application claims the priority benefit of Taiwan Application serial no. 107123893, filed Jul. 10, 2018, the full disclosure of which is incorporated herein by reference.

FIELD OF INVENTION

The invention relates to a power conversion device and a control method thereof. More particularly, the invention relates to a power conversion device and a control method thereof for power transistor driving circuit.

BACKGROUND

Power MOS transistors are the most commonly used power electronic elements in power conversion devices. In order to reduce the power transistor switching loss of the power conversion device, a faster power transistor is proposed. In order to achieve better conversion efficiency, generally, the driving resistance of the power transistor may be adjusted, the resistance value of the driving resistor may be lowered, and the driving current may be increased, so as to achieve smaller switching loss, and elevate the efficiency of the conversion device.

However, the negative effect of increasing the power transistor conduction time and elevating the power transistor conducting speed is that the surge of the secondary side power element of the conversion device may increase at the time of cutoff, and the surge voltage may increase significantly with the increase of the input voltage of the conversion device, even exceeding the rated voltage of the power transistor itself, in addition, the surge voltage may cause the electromagnetic interference which reduces the efficiency of the power conversion device.

Therefore, how to control the driving capability of the power transistor effectively, elevate the efficiency of the power conversion device, and lower the electromagnetic interference, are problems to be improved in the field.

SUMMARY

An embodiment of this disclosure is to provide a power conversion device includes a primary side rectifier, a main converter, a secondary side rectifier, a secondary side feedback controller, a PWM controller, and a driving compensator. The primary side rectifier is configured to generate a first voltage. The main converter includes a power transistor and is configured to adjust the first voltage to generate a second voltage according to a control signal. The secondary side rectifier is configured to generate an output voltage according to the second voltage. The secondary side feedback controller is configured to generate a feedback signal according to the output voltage. The PWM controller is configured to generate a PWM signal according to the feedback signal. The driving compensator includes a driving resistor circuit. The PWM signal outputs the control signal through the driving resistor circuit, and the driving compensator is configured to adjust a resistance value of the driving resistor circuit according to the first voltage.

An embodiment of this disclosure is to provide a control method configured to control a power conversion device. The control method includes the following operations: generating, by a primary side rectifier, a first voltage; generating, by a main converter, a second voltage according to a control signal to adjust the first voltage; generating, by a secondary side rectifier, an output voltage according to the second voltage; generating, by a secondary side feedback controller, a feedback signal according to the output voltage; generating, by a PWM controller, a PWM signal according to the feedback signal; adjusting, by a driving compensator, a resistance value of a driving resistor circuit according to the first voltage; and outputting the control signal according to the PWM signal through the driving resistor circuit.

Therefore, according to the technical aspects of the present disclosure, the embodiments of the present disclosure provides a power conversion device and a control method thereof, so as to control the current amount of the control signal outputted to the power transistor by adjusting the resistance value of the driving resistor circuit in the situation of low voltage or high voltage, and further controls the conduction time of the power transistor, so as to elevate the efficiency of the power conversion device, and lower the electromagnetic interference. To be more detailed, in the embodiments of the present disclosure, when the voltage value outputted by the primary side rectifier is lower, the driving current outputted to the power transistor is higher, so that the conduction time of the power transistor is faster and the switching speed is higher, and the efficiency of the power conversion device is further elevated. On the other hand, when the voltage value outputted by the primary side rectifier is higher, the driving current outputted to the power transistor is lower, which reduces the surge voltage, and further reduces the electromagnetic interference.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
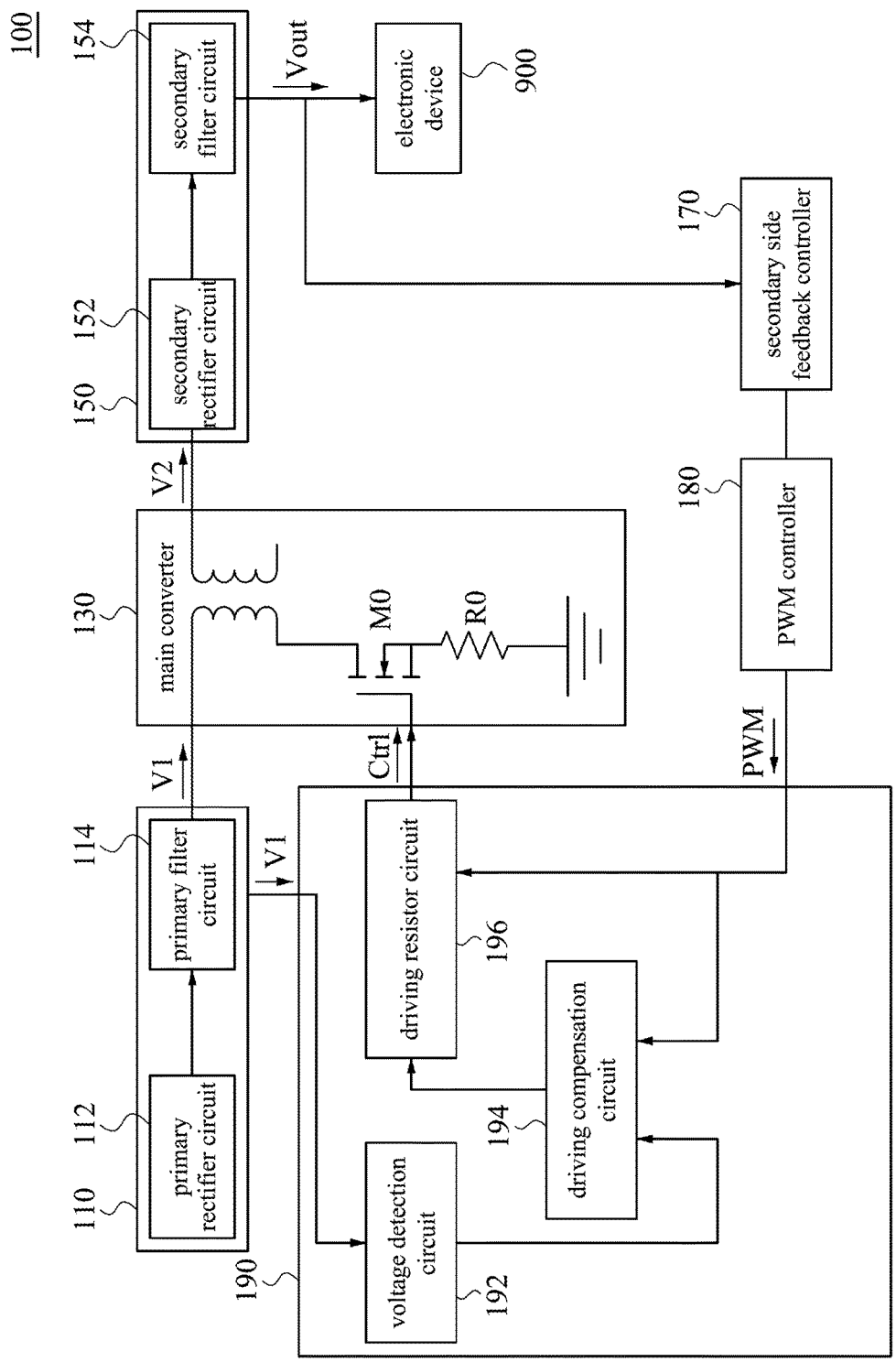
FIG. 1 is a schematic diagram illustrating a power conversion device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

FIG. 1 is a schematic diagram illustrating a power conversion device 100 according to some embodiments of the present disclosure. The power conversion device 100 includes a primary side rectifier 110, a main converter 130, a secondary side rectifier 150, a secondary side feedback controller 170, a PWM controller 180, and a driving compensator 190. The power conversion device 100 as illustrated in FIG. 1 is for illustrative purposes only, and the present disclosure is not limited thereto.

In the connection relationship, the primary side rectifier 110 is coupled to the main converter 130 and the driving compensator 190. The main converter 130 is coupled to the secondary side rectifier 150. The secondary side feedback controller 170 is coupled to the secondary side rectifier 150. The PWM controller 180 is coupled to the secondary side feedback controller 170 and the driving compensator 190.

In some embodiments, as illustrated in FIG. 1, the primary side rectifier 110 includes a primary rectifier circuit 112 and a primary filter circuit 114. The main converter 130 includes a power transistor MO and a resistor RO. The secondary side rectifier 150 includes a secondary rectifier circuit 152 and a secondary filter circuit 154. The driving compensator 190 includes a voltage detection circuit 192, a driving compensation circuit 194, and a driving resistor circuit 196.

In the operational relationship, the primary side rectifier 110 generates a voltage V1. The main converter 130 adjusts the voltage V1 to generate the voltage V2 according to the control signal Ctrl. The secondary side rectifier 150 generates the output voltage Vout to the electronic device 900 according to the voltage V2. The secondary side feedback controller 170 generates the feedback signal according to the output voltage Vout. The PWM controller 180 generates the PWM signal PWM according to the feedback signal. The PWM signal PWM outputs the control signal Ctrl through the driving resistor circuit 196.

The detailed structure and operation of the driving compensator 190 may be described in the following with FIG. 2 to FIG. 4.

Figure 2:
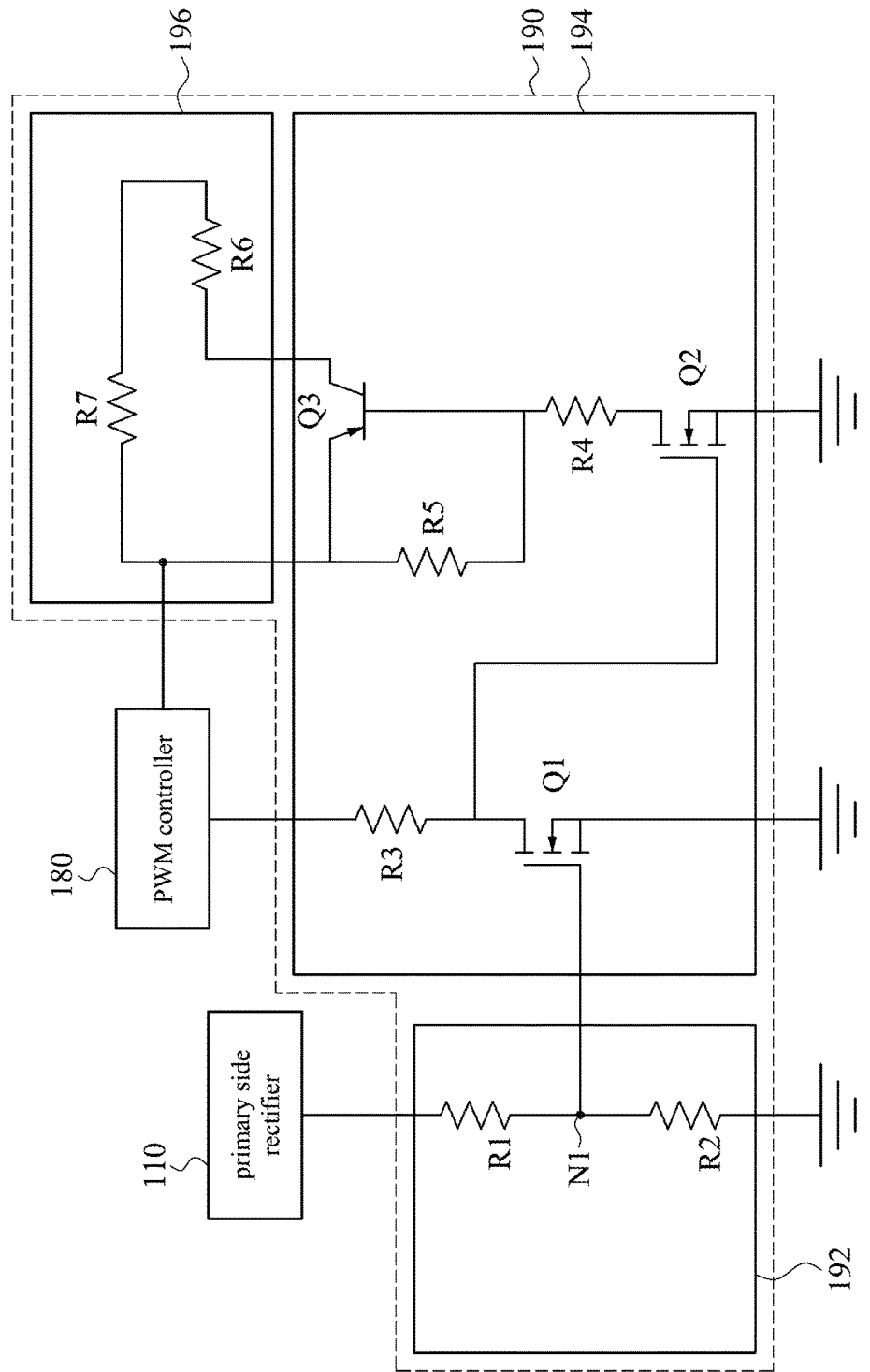
FIG. 2 is a schematic diagram illustrating a driving compensator according to some embodiments of the present disclosure.

Reference is made to FIG. 2. FIG. 2 is a schematic diagram illustrating a driving compensator 190 according to some embodiments of the present disclosure. As illustrated in FIG. 2, the driving compensator 190 includes a voltage detection circuit 192, a driving compensation circuit 194, and a driving resistor circuit 196. In the connection relationship, the voltage detection circuit 192 is coupled to the primary side rectifier 110, the driving compensation circuit 194 is coupled to the voltage detection circuit 192 and the PWM controller 180. The driving resistor circuit 196 is coupled to the PWM controller 180 and the driving compensation circuit 194.

In the operation relationship, the voltage detection circuit 192 is configured to detect the voltage V1, and the driving compensation circuit 194 is configured to adjust the resistance value of the driving resistor circuit 196 according to the voltage V1.

As illustrated in FIG. 2. The voltage detection circuit 192 includes resistors R1, R2. The resistor R1 and the resistor R2 are connected in series. The driving compensation circuit 194 includes switches Q1, Q2, and Q3. In the connection relationship, the switch Q1 is coupled to the PWM controller 180. The switch Q2 is coupled to the switch Q1 and the PWM controller 180. The switch Q3 is coupled to the switch Q2 and the driving resistor circuit 196.

In some embodiments, the driving compensation circuit 194 further includes resistors R3, R4 and R5. The switch Q1 couples to the PWM controller 180 through the resistor R3. The switch Q2 couples to the switch Q3 through the resistor R4.

Reference is further made to FIG. 2. The driving resistor circuit 196 includes resistors R6, R7. The resistor R7 couples to the second switch Q2 through the resistor R5 and the resistor R4. The resistor R6 is coupled to the resistor R7 and the switch Q3.

In some embodiments, the switches Q1, Q2 may be P-type MOS transistors or N-type MOS transistors (NMOS). In some embodiments, the switch Q3 may be a NPN type transistor or a PNP type transistor. For illustrative purposes, in the embodiments of the present disclosure, for illustrative purposes, take N type metal-oxide semiconductor transistor (NMOS) and PNP type transistor for example, however, the present disclosure is not limited thereto.

In some embodiments, when the voltage V1 outputted from the primary side rectifier 110 is higher than the voltage threshold, the resistance value of the driving resistor circuit 196 is a first resistance value. When the voltage V1 outputted from the primary side rectifier 110 is lower than the voltage threshold, the resistance value of the driving resistor circuit 196 is a second resistance value. The relationship between the voltage V1 outputted from the primary side rectifier 110 and the resistance value of the driving resistor circuit 196 will be described in detail with reference to FIG. 3 and FIG. 4 in the following.

Figure 3:
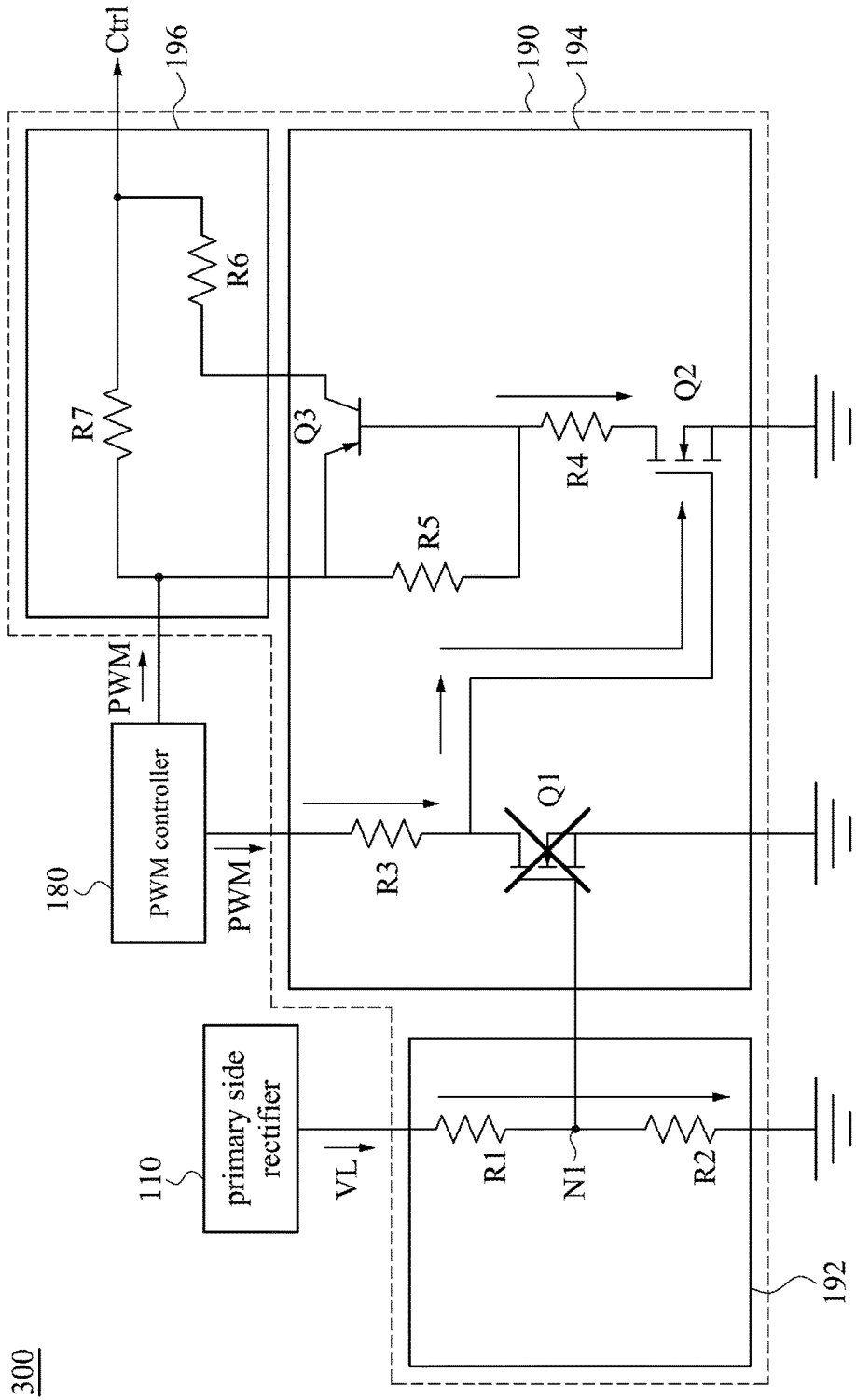
FIG. 3 is an operation diagram of the driving compensator as illustrated in FIG. 2 according to some embodiments of the present disclosure.

Reference is made to FIG. 3. FIG. 3 is an operation diagram 300 of the driving compensator 190 in FIG. 2 according to some embodiments of the present disclosure.

As illustrated in FIG. 3, when the voltage value VL of the voltage V1 outputted from the primary side rectifier 110 is lower than the voltage threshold, the voltage division of the node N1 between the resistor R1, R2 is lower, the switch Q1 is unable to be conducted. At this time, the PWM controller 180 outputs the PWM signal PWM, the PWM signal PWM is transmitted to the gate of the switch Q2 through the resistor R3, so as to conduct the switch Q2. After the switch Q2 is conducted, pull the level of the collector terminal of the switch Q3 to ground. Therefore, the switch Q3 is conducted. After the switch Q3 is conducted, the resistors R6, R7 are conducted in parallel. After the resistors R6, R7 are conducted in parallel, the resistance value of the driving resistor circuit 196 reduces, so that the driving current included in the control signal Ctrl increases, in which the control signal Ctrl is outputted from the driving compensator 190 to the power transistor MO of the main converter 130.

It may be known from the above, in the embodiments of the present disclosure, when the voltage value of the voltage V1 outputted from the primary side rectifier 110 is lower, the driving current included in the control signal Ctrl, which is outputted to the power transistor MO, is higher. The driving current higher may speed up the conduction time of the power transistor MO, and the switching speed of the power transistor MO may further be faster. In this way, the efficiency of the power conversion device 100 may be increased.

Figure 4:
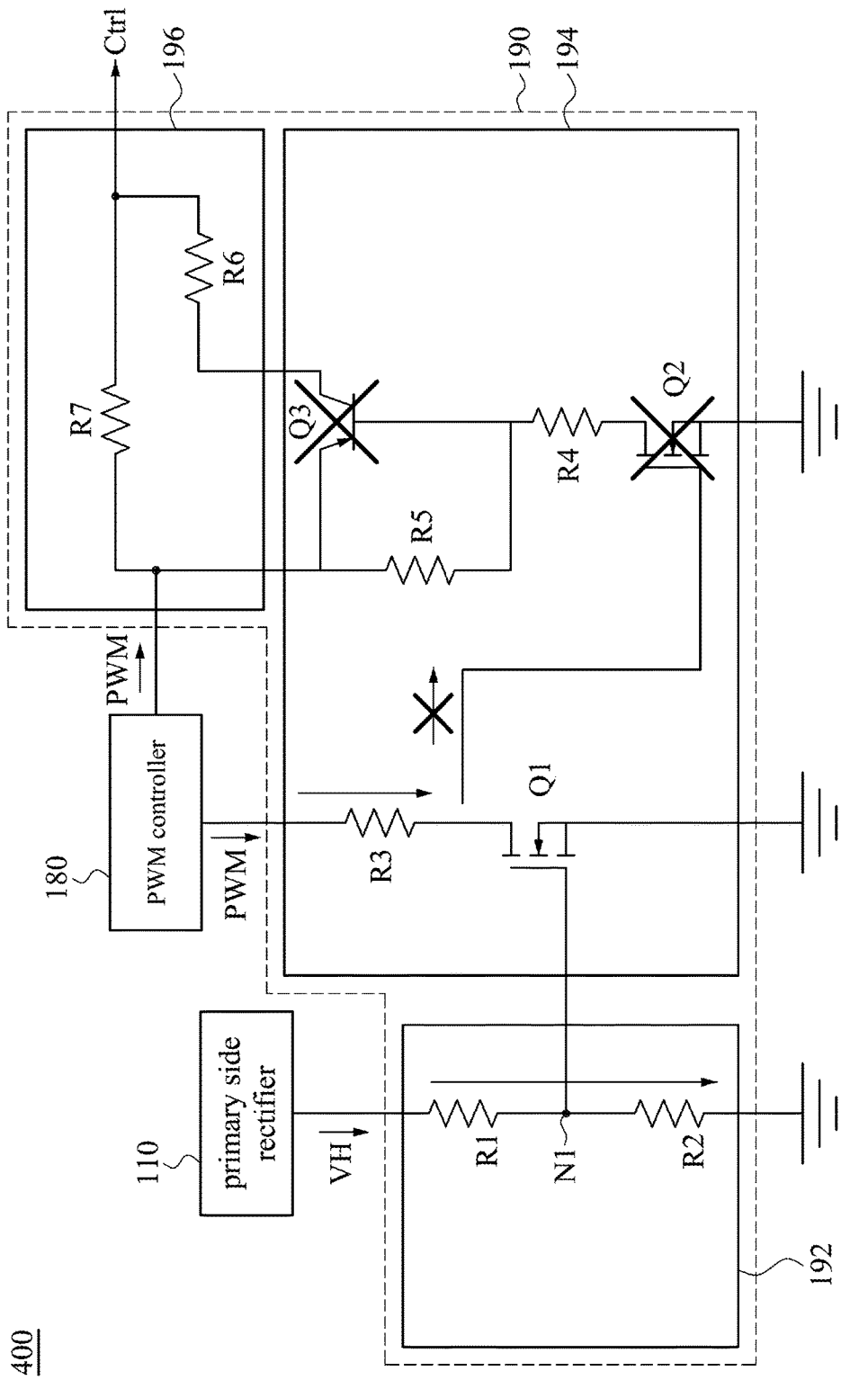
FIG. 4 is an operation diagram of the driving compensator as illustrated in FIG. 2 according to some embodiments of the present disclosure.

Reference is made to FIG. 4. FIG. 4 is an operation diagram 400 of the driving compensator 190 in FIG. 2 according to some embodiments of the present disclosure.

As illustrated in FIG. 4, when the voltage value VH of the voltage V1 outputted from the primary side rectifier 110 is higher than the voltage threshold, the voltage division of the node N1 between the resistors R1 and R2 is higher, and the switch Q1 is conducted. After the switch Q1 is conducted, the signal of the gate terminal of the switch Q2 may be pulled to the ground level, which makes the switch Q2 unable to be conducted. When the switch Q2 is unable to be conducted, the switch Q3 is hence unable to be conducted. Therefore, the current only flows through the resistor R7, but the current does not flow through the resistor R6. At this time, the resistance value of the driving compensator 190 only includes the resistance value of the resistor R7, the driving current included in the control signal Ctrl, which is outputted to the power transistor MO of the main converter 130 from the driving compensator 190, is reduced.

Generally speaking, when the conducting speed of the power transistor MO increases, the surge voltage of the secondary side elements increases at the cutoff. Furthermore, when the voltage value of the voltage V1 outputted from the primary side rectifier 110 is higher, the surge voltage is more prominent, and higher surge voltage may cause electromagnetic interference. However, it may be know from the above, in the embodiments of the present disclosure, when the voltage value of the voltage V1 outputted from the primary side rectifier 110 is higher, the driving current included in the control signal Ctrl, which is outputted to the power transistor MO, may be effectively reduced. When the driving current is reduced, the surge voltage is reduced, and the electromagnetic interference is reduced.

In summary, in the embodiments of the present disclosure, when the voltage V1 outputted from the primary side rectifier 110 is a low voltage value, the driving current included in the control signal Ctrl is higher, which makes the conduction time of the power transistor MO shorter and the switching speed faster, further reduces the switching loss, and elevates the efficiency of the power conversion device 100. In contrast, when the voltage V1 outputted from the primary side rectifier 110 is a high voltage value, the driving current included in the control signal Ctrl is reduced, which reduces the surge voltage, and further reduces the electromagnetic interference.

In some embodiments, the low voltage value that is lower than the voltage threshold may be 100V, 110V, or 120V, which are commonly used in Taiwan, Japan, and so on. On the other hand, the high voltage value that is higher than the voltage threshold may be 220V, which is commonly used in China and so on. That is, the power conversion device 100 discloses in the embodiments of the present disclosure may be suitable for power source with different voltage value. The low voltage value and high voltage value mentioning above are for illustrative purposes only, and the embodiments of the present disclosure are not limited thereto.

In some embodiments, the voltage threshold may be controlled through designing the driving threshold of the switch Q1 of the driving compensation circuit 194. That is, by designing the driving threshold of the switch Q1 of the driving compensation circuit 194, when the voltage V1 is a high voltage, the voltage division value of the node N1 is higher than the driving threshold of the switch Q1, and the switch Q1 is further conducted. In contrast, when the voltage V1 is a low voltage, the voltage division value of the node N1 is lower than the driving threshold of the switch Q1, at this time, the switch Q1 is unable to be conducted.

Figure 5:
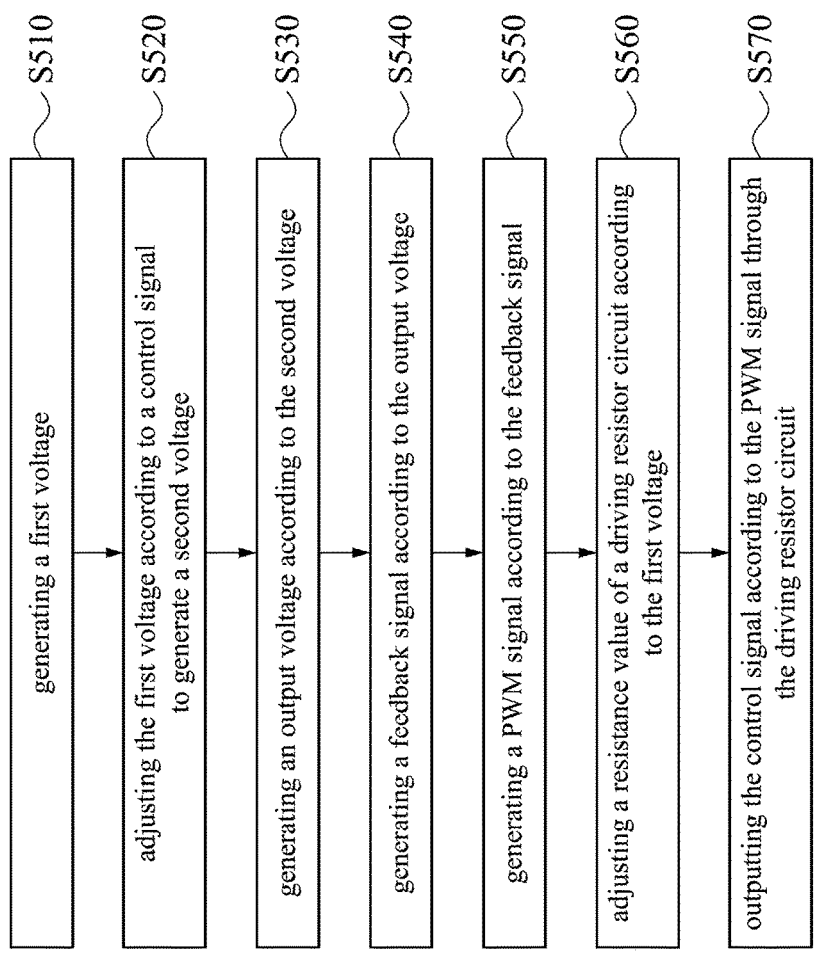
FIG. 5 is a flow chart illustrating a control method of the power conversion device according to some embodiments of the present disclosure.

Reference is made to FIG. 5. FIG. 5 is a flow chart illustrating a control method 500 of the power conversion device 100 according to some embodiments of the present disclosure. The control method 500 includes operations S510 to S570.

For ease of understanding the control method 500 of the power conversion device 100, reference is made to FIG. 1 and FIG. 5.

In operation S510, generating a first voltage. In some embodiments, operation S510 may be operated by the primary side rectifier 110 as illustrated in FIG. 1. For example, the primary side rectifier 110 generates voltage V1 and outputs voltage V1 to the driving compensator 190 and the main converter 130.

In operation S520, adjusting the first voltage according to a control signal to generate a second voltage. In some embodiments, the operation S520 may be operated by the main converter 130 in FIG. 1. For example, the driving compensator 190 outputs the control signal Ctrl to the main converter 130, the main converter 130 adjusts the voltage V1 according to the control signal Ctrl to generate voltage V2.

In operation S530, generating an output voltage according to the second voltage. In some embodiments, operation S530 may be operated by the secondary side rectifier 150 as illustrated in FIG. 1. For example, the secondary side rectifier 150 receives the voltage V1 and generates the output voltage Vout according to the voltage V2.

In operation S540, generating a feedback signal according to the output voltage. In some embodiments, the operation S540 may be operated by the secondary side feedback controller 170 as illustrated in FIG. 1. For example, the secondary side feedback controller 170 receives the output voltage Vout and generates the feedback signal according to the output voltage Vout.

In operation S550, generating a PWM signal according to the feedback signal. In some embodiments, operation S550 may be operated by the PWM controller 180 as illustrated in FIG. 1. For example, the PWM controller 180 receives the feedback signal and generates the PWM signal PWM according to the feedback signal, then, outputting the PWM signal PWM to the driving compensation circuit 194 and the driving resistor circuit 196 of the driving compensator 190.

In operation S560, adjusting a resistance value of a driving resistor circuit according to the first voltage. In some embodiments, operation S560 may be operated by the driving compensator 190 as illustrated in FIG. 1. For example, the driving compensator 190 adjusts the resistance value of the driving resistor circuit 196 according to the voltage V1.

In some embodiments, in detail, reference is made to FIG. 3 and FIG. 4. As illustrated in FIG. 3, when the voltage value VL of the voltage V1 outputted from the primary side rectifier 110 is lower than the voltage threshold, the voltage division of the node N1 between the resistors R1 and R2 is lower, and the switch Q1 is unable to be conducted. At this time, the PWM controller 180 outputs the PWM signal PWM, the PWM signal PWM is transmitted to the gate of the switch Q2 through the resistor R3, so as to conduct the switch Q2. After the switch Q2 is conducted, the level of the collector terminal of the switch Q3 is pulled to the ground, therefore, the switch Q3 is conducted. After the switch Q3 is conducted, the resistors R6 and R7 may be connected in parallel. After the resistors R6 and R7 are connected in parallel, the resistance value of the driving resistor circuit 196 is reduced, which makes the driving current included in the control signal Ctrl increase, in which the control signal Ctrl is outputted to the power transistor MO of the main converter 130 from the driving compensator 190.

On the other hand, reference is made to FIG. 4. As illustrated in FIG. 4, when the voltage value VH of the voltage V1 outputted from the primary side rectifier 110 is higher than the voltage threshold, the voltage division of the node N1 between the resistors R1 and R2 is higher, the switch Q1 is conducted. After the switch Q1 is conducted, the signal of the gate terminal of the switch Q2 is pulled to the ground level, which makes the switch Q2 unable to be conducted. When the switch Q2 is unable to be conducted, the switch Q3 is also unable to be conducted. Therefore, the current only flows through the resistor R7, but the current does not flow through the resistor R6. At this time, the resistance value of the driving compensator 190 only includes the resistance value of the resistor R7, the driving current included in the control signal Ctrl is reduced, in which the control signal Ctrl is outputted to power transistor MO of the main converter 130 from the driving compensator 190.

In operation S570, outputting the control signal according to the PWM signal through the driving resistor circuit. In some embodiments, operation S570 may be operated by the driving compensator 190 as illustrated in FIG. 1. For example, the PWM signal PWM outputted from the PWM controller 180 generates the control signal Ctrl through the driving resistor circuit 196, and outputs control signal Ctrl to the power transistor MO.

In some embodiments, the primary side rectifier 110 may be a device or circuit with the functions of voltage generating, rectifying, filtering, or other similar functions. In some embodiments, the main converter 130 may be a device or circuit with the functions of voltage conversion or other similar functions. In some embodiments, the secondary side rectifier 150 may be a device or circuit with the functions of voltage generating, rectifying, filtering, or other similar functions. In some embodiments, the secondary side feedback controller 170 may be a device or circuit with the function of signal feedback or other similar functions. In some embodiments, the PWM controller 180 may be a device or circuit with the function of pulse width modulation or other similar functions. In some embodiments, the driving compensator 190 may be a device or circuit with the functions of voltage detection, driving compensation, resistor adjustment or other similar functions. In some embodiments, the power conversion device 100 may be a device or circuit with the function of power conversion or other similar functions.

It may be known from the embodiments mentioning above, the embodiments of the present disclosure provide a power conversion device and a control method thereof, so as to control the current amount of the control signal outputted to the power transistor by adjusting the resistance value of the driving resistor circuit in the case of low voltage or high voltage, and further control the conduction time of the power transistor, so as to increase the efficiency of the power conversion device, and reduce the electromagnetic interference.

According to the embodiment of the present disclosure, it is understood that the embodiment of the present disclosure is to provide a light emitting diode driving system and burning method thereof, and in particular, a light emitting diode driving system and burning method thereof to burn an output current by infrared ray, in order to effectively save the use of resistors when setting the output current and the time cost when preparing a different resistance of the fixture. In addition, the output current of multiples devices may be burned at one time, and it may also avoid the production line to get the wrong resistor to set the current.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power conversion device, comprising:
a primary side rectifier configured to generate a first voltage;
a main converter comprising a power transistor and being configured to adjust the first voltage to generate a second voltage according to a control signal;
a secondary side rectifier configured to generate an output voltage according to the second voltage;
a secondary side feedback controller configured to generate a feedback signal according to the output voltage;
a PWM controller configured to generate a PWM signal according to the feedback signal; and
a driving compensator comprising a driving resistor circuit, wherein the PWM signal outputs the control signal through the driving resistor circuit, and the driving compensator is configured to adjust a resistance value of the driving resistor circuit according to the first voltage;
wherein the driving compensator comprises:
a voltage detection circuit coupled to the primary side rectifier and configured to detect the first voltage; and
a driving compensation circuit coupled to the voltage detection circuit and configured to adjust the resistance value of the driving resistor circuit according to the first voltage.

2. The power conversion device of claim 1, wherein when the first voltage comprises a first voltage value, the resistance value is a first resistance value, and when the first voltage comprises a second voltage value, the resistance value is a second resistance value, wherein the second resistance value is higher than the first resistance value, and the first voltage value is lower than the second voltage value.

3. The power conversion device of claim 1, wherein the driving compensation circuit comprises:
a first switch coupled to the PWM controller;
a second switch coupled to the first switch and the PWM controller; and
a third switch coupled to the second switch and the driving resistor circuit.

4. The power conversion device of claim 3, wherein the driving resistor circuit comprises:
a first resistor coupled to the second switch; and
a second resistor coupled to the first resistor and the third switch.

5. The power conversion device of claim 4, wherein when the voltage detection circuit detects a first voltage value, the first switch and the second switch are not conducted, and the third switch is conducted.

6. The power conversion device of claim 5, wherein the first resistor and the second resistor are conducted in parallel.

7. The power conversion device of claim 4, wherein when the voltage detection circuit detects a second voltage value, the first switch is conducted, and the second switch and the third switch are not conducted.

8. The power conversion device of claim 7, wherein the first resistor is conducted.

9. The power conversion device of claim 1, wherein the voltage detection circuit comprises a first resistor and a second resistor, wherein the first resistor and the second resistor are connected in series.

10. A control method, configured to control a power conversion device, wherein the control method comprises:
generating, by a primary side rectifier, a first voltage;
generating, by a main converter, a second voltage according to a control signal to adjust the first voltage;
generating, by a secondary side rectifier, an output voltage according to the second voltage;
generating, by a secondary side feedback controller, a feedback signal according to the output voltage;
generating, by a PWM controller, a PWM signal according to the feedback signal;
adjusting, by a driving compensator, a resistance value of a driving resistor circuit according to the first voltage; and
outputting the control signal according to the PWM signal through the driving resistor circuit;
wherein the operation of adjusting, by a driving compensator, a resistance value of a driving resistor circuit according to the first voltage comprising:
detecting, by a voltage detection circuit, the first voltage; and
adjusting, by a driving compensation circuit of the driving compensator, the resistance value of the driving resistor circuit according to the first voltage.

11. The control method of claim 10, further comprising:
adjusting the resistance value to be a first resistance value when the first voltage comprising a first voltage value; and
adjusting the resistance value to be a second resistance value when the first voltage comprising a second voltage value;
wherein the second resistance value is higher than the first resistance value, and the first voltage value is lower than the second voltage value.

12. The control method of claim 10, wherein the driving compensation circuit comprises a first switch, a second switch, and a third switch, wherein the first switch is coupled to the PWM controller, the second switch is coupled to the first switch and the PWM controller, the third switch is coupled to the second switch and the driving resistor circuit, wherein the control method further comprises:
non-conducting the first switch and the second switch, and conducting the third switch when the voltage detection circuit detects a first voltage value.

13. The control method of claim 12, wherein the driving resistor circuit comprises a first resistor and a second resistor, wherein the first resistor is coupled to the second switch, and the second resistor is coupled to the first resistor and the third switch, wherein the control method further comprises:
conducting the first resistor and the second resistor in parallel.

14. The control method of claim 10, wherein the driving compensation circuit comprises a first switch, a second switch, and a third switch, wherein the first switch is coupled to the PWM controller, the second switch is coupled to the first switch and the PWM controller, the third switch is coupled to the second switch and the driving resistor circuit, wherein the control method further comprises:
conducting the first switch, and non-conducting the second switch and the third switch when the voltage detection circuit detects a second voltage value.

15. The control method of claim 14, wherein the driving resistor circuit comprises a first resistor and a second resistor, wherein the first resistor is coupled to the second switch, and the second resistor is coupled to the first resistor and the third switch, the control method further comprises:
conducting the first resistor.

* * * * *